Patented June 26, 1951

2,558,256

UNITED STATES PATENT OFFICE 2,558,256

PROCESS FOR THE MANUFACTURE OF A SOFT CHEESE PRODUCT

Jens Anathon Killengreen, Bryne, Jaeren, Norway

No Drawing. Application November 22, 1948, Serial No. 61,528. In Norway June 26, 1945

5 Claims. (Cl. 99—116)

The present invention relates to the manufacture of soft cheese products and has for its object a process of producing a special type of soft cheese having a creamlike consistency and being particularly suitable for use as a dessert cheese.

An important feature of the process according to the invention consists therein that skim milk is used as an initial material in the production of the cheese. Another important characteristic feature of the process as compared with conventional methods consists therein that a body of cheese (or curd) as obtained by a combined rennet and acid coagulation subsequent to high pasteurization of the milk, is subjected to a mechanical working treatment and to an adjustment of an increased percentage of fat after removal of whey from the cheese by pressing.

The said working of the pressed cheese is preferably carried out in such a way as to obtain a homogeneous mixture of all of the three states of aggregation (gaseous, liquid and solid matter).

In order to obtain the most desirable consistency, flavor and composition by the use of this process it is also of importance that the coagulation is brought about by the aid of rennet as the principal coagulation agent.

In connection with a prior process for the production of soft cheese, the so-called "cottage cheese," the milk is so weakly pasteurized, at 142° F. (61$^1/_9$° C.) for 30 minutes, that the curdling power of the rennet is not affected to any substantial degree, because this would cause defects in the resulting cheese. The object of the pasteurization therefore is to kill the bacteria. In order that the cheese shall not become too hard and dry, the curdling is brought about practically only by means of acid (1% acid). The cheese therefore becomes so sour that the coagulate in the course of the subsequent treatment must be washed repeatedly (in two batches of water). The amount of rennet added (1 cm.³ to each 100 liters of milk) is so small and the ripening temperature so low (70° F.—21$^1/_9$° C.) that the rennet will be of little imporance in the curdling process. This is apparent from the fact that the amount of rennet is only 1 part to each 1,000 parts of acid added and that this latter is 1 per cent of the milk. But the rennet will no doubt aid in causing the granules of cheese to contract and to expel whey from same, in the course of the subsequent heating step. The object of the addition of rennet is primarily to cause contraction of cheese granules and expulsion of whey. The same object is to be obtained by the subsequent heating. When the whey has run off, thin cream (18% of fat) is added if a soft cheese is desired, and thick cream (35% of fat) when a more solid cheese is to be obtained.

In connection with another cheese (U. S. A. Patent No. 1,661,601) the initial material employed is a mixture of cream (with for example 34% fat) and dry milk (from skim milk) as well as gelatine or agar-agar (0.5-1%). After this mixture has been subjected to pasteurization by heating to 145° F (62$^7/_9$° C.) for 30 minutes or to 180° F. (82$^2/_9$° C.) for 10 minutes coagulation is brought about by means of acid while at rest. This cheese is produced without pressing and without mechanical working after completed coagulation. The resulting cheese is of such solid consistency that it is capable of being cut into slices having a solid surface.

According to the present invention a different cheese making technique is used. Hereby a cheese of a character quite different from "cottage cheese" and the cheese obtained according to U. S. A. Patent No. 1,661,601 is obtained. The cheese according to the present invention may for example be produced as follows:

The milk is centrifuged and subjected to a high pasteurization treatment whereby it will become so strongly pasteurized that the rennet power is considerably weakened, whereupon it is cooled to the curdling temperature which should be below 82.4° F. (28° C.) or above 113° F. (45° C.). When the milk is so strongly pasteurized this is to cause the curdling to take place by means of rennet without obtaining a coagulate of too hard a consistency. Rennet as well as acid culture (ordinary "lactic acid starter" a culture of genuine lactic acid bacteria) are added, the amount of rennet and the temperature being so controlled that a long curdling time, at least 6 hours is required. But out of regard to the division of work in the course of manufacture, a curdling time of 20-24 hours is preferred. If the cheese shall not become too sour, the rennet must be the major coagulation agent. The amount of rennet (ordinary commercial product, strength 1:10,000) therefore must be large in relation to the amount of acid starter (acidity 35-40° S—H) and ought to be at least 10% of the amount of acid. Good results have been obtained with about 10 g. of rennet and 20 g. of acid starter to each 100 liters of milk. After rennet and acid have been intimately mixed with the milk, the milk is left standing until the curd has contracted so much that the expulsion of whey begins. The body of cheese (curd) shall not be cut nor stirred nor after-heated, but is to be pressed to remove whey.

The pressed body of cheese is subjected to mechanical working to form a uniform homogeneous mass.

The cheese mass so obtained is quite poor in fat. The percentage of fat is then adjusted by the addition of cream or other emulsions of fat. If the cream or emulsion is added without a preparatory treatment and is only uniformly incorporated into the cheese mass, the resulting cheese product will be heavy and thick. It will then consist of a uniform mixture of the two states of aggregation solid and liquid. In order to make the cheese lighter it is converted into a homogeneous mixture of all of the three states of aggregation, solids, liquid and gas. This may for example be brought about by whipping the cream or the emulsion of fat to a foamlike product before it is added. In order that the cheese shall become of an even lighter quality a suitable gelatinizing substance and carbonic acid gas may be added.

A suitable quantity is ½ percent of gelatine to the amount of cream, or corresponding amounts of tragacanth or alginate. At the same time flavoring and sweetening substances are added and it may be also permissible preserving agents and/or other suitable protecting agents such as for example antitoxidants. Serviceable are for example hydroquinone and esters of gallic acid and low molecular alcohols. 0.07 percent of ethylgallate added to the cream is a suitable quantity.

The best results, in relation to the price is obtained, when the cheese is manufactured in a semi-fat condition or about so. It will then be like whipped cream or fromage in spite of the fact that it only contains a small percentage of fat. The incorporation of cream or flavoring substances etc. above mentioned may also be omitted in connection with the manufacturing operation proper, in which case the incorporation of the said substances may be left to the consumers.

It is generally known to produce cheese mass (or curd) from milk by the addition of rennet and/or acid. Among cheese makers it is also known that high-pasteurization weakens the rennet power, produces finely flocculated coagulate, and a consequent undesirable structure in the cheese. In dairy practice therefore the milk is so weakly pasteurized as possible in order not to weaken the rennet power.

These known facts are utilized according to the present invention to obtain a product of a special character, viz. a soft cheese of creamlike consistency and without a marked sour taste.

The process according to the invention imparts to the cheese a character, which allows of giving it the desired flavor by means of a simple finishing treatment.

The expression "high pasteurization" and "strong pasteurization" employed in the above specification and in the appended claims are used in the conventional meaning of the terms as usual in modern dairy practice and literature, viz. the heating to a temperature of above 80° C. (see for example: "Meiriteknologi" by Kr. Storen, Oslo 1938 and "Meierilaere" by O. S. Hansen and H. V. Knudsen, Odense 4th edition).

I claim:

1. Process for the manufacture of a soft cheese product suitable for use as a dessert cheese comprising the steps of subjecting skim milk to a strong pasteurization treatment to bring about a considerable reduction of the capability of the milk to be coagulated by rennet action, cooling the pasteurized skim milk, adding rennet as well as a small amount of acid starter to the cooled pasteurized milk, causing the rennet and acid to exert their action on the milk at temperatures far below pasteurization temperature for several hours, whereby a finely flocculated curd is obtained, pressing the finely flocculated curd to remove whey therefrom, subjecting the curd to a mechanical disintegration and homogenizing treatment, incorporating a gas into an emulsion of fat in aqueous liquid by mechanical working to produce a foamlike product of the character of whipped cream, adding a controlled quantity of the product so obtained to the prepared curd product and intimately mixing the said curd product with the added emulsion, the amount of added emulsion being so controlled as to adjust the final product on a predetermined percentage of fat.

2. Process according to claim 1 in which the emulsion product to be added to the curd is obtained by incorporating air into cream.

3. Process according to claim 1 in which the amount of added rennet of conventional commercial strength is in the range of not less than about 10 g. to each 100 liters of milk.

4. Process according to claim 1 in which the amount of added conventional dairy acid starter, is in the range of not more than about 20 g. to each 100 liters of milk.

5. Process according to claim 1 in which the finely flocculated curd obtained by the long-lasting action of rennet and acid on the pasteurized skim milk is pressed without first being subjected to afterheating.

JENS ANATHON KILLENGREEN.

REFERENCES CITED

The following references are of record in the file of this patent:

UNITED STATES PATENTS

| Number | Name | Date |
|---|---|---|
| 97,709 | Scheaffer | Dec. 7, 1869 |
| 482,897 | Frederiksen | Sept. 10, 1892 |
| 2,160,159 | Lundstedt | May 30, 1939 |

OTHER REFERENCES

"Condensed Milk and Milk Powder" by O. H. Hunziker, 6th edition, published March 1946 by the author, La Grange, Ill., page 386.

"Bulletin No. 576," U. S. Dept. of Agriculture, Washington, D. C., Sept. 27, 1917.

"Miscellaneous Publication No. 119," U. S. Dept. of Agriculture, Washington, D. C., issued October 1931, revised February 1934.